United States Patent [19]

Delude et al.

[11] Patent Number: 4,789,030

[45] Date of Patent: Dec. 6, 1988

[54] PRODUCTION OF HYDROGEN SULPHIDE CONTAINING GAS FROM UNDERGROUND FORMATIONS

[75] Inventors: Stephen G. Delude, Oakville; Edward A. Luinstra, Burlington, both of Canada

[73] Assignee: Shell Oil Company, Houston, Tex.

[21] Appl. No.: 82,454

[22] Filed: Aug. 7, 1987

[30] Foreign Application Priority Data

Aug. 20, 1986 [GB] United Kingdom ................ 8620272

[51] Int. Cl.$^4$ ...................... E21B 41/02; E21B 43/24; E21B 43/40
[52] U.S. Cl. .................................... 166/267; 166/302; 166/310; 166/371; 166/902
[58] Field of Search ............... 166/266, 267, 310, 371, 166/902, 302, 303; 208/108, 110

[56] References Cited

U.S. PATENT DOCUMENTS 4,021,334 5/1977 Gorring ............................... 208/211

Primary Examiner—George A. Suchfield

[57] ABSTRACT

Production of at least a gaseous product containing a substantial amount of hydrogen sulphide via a bore-hole from an underground formation containing besides the hydrogen sulphide at least elemental sulphur by (a) injection of a liquid substantially consisting of hydrocarbons into the bore-hole or into the underground formation near to the end of the bore-hole;

(b) producing a gaseous and a liquid fraction from the underground formation;

(c) separating the gaseous fraction from the liquid fraction;

(d) if necessary, separating an aqueous fraction of the product liquid fraction from the hydrocarbons-containing fraction;

(e) heating the hydrocarbons-containing fraction preferably in the presence of hydrogen and a hydro-desulphurization catalyst, in order to remove elemental sulphur; and (f) reinjection of at least a part of the thus treated hydrocarbons-containing fraction into the bore-hole or into the underground formation near to the end of the bore-hole.

9 Claims, No Drawings

PRODUCTION OF HYDROGEN SULPHIDE CONTAINING GAS FROM UNDERGROUND FORMATIONS

FIELD OF THE INVENTION

The invention relates to a process for the production of at least a gaseous product containing a substantial amount of hydrogen sulphide via a bore-hole from an underground formation containing besides the hydrogen sulphide at least elemental sulphur.

BACKGROUND OF THE INVENTION

The presence of elemental sulphur in underground formations containing substantial amounts of hydrogen sulphide may cause considerable problems during the production of hydrogen sulphide-containing gas from these underground formations. The sulphur can deposit in the well bore and plug the well, it also can cause scaling and contribute to high corrosion rates. It is remarked that the term "elemental sulphur" also comprises forms of chemically bound sulphur that can readily transform to elemental sulphur, for instance hydrogen polysulphides.

In order to minimize the potential for sulphur related problems a suitable liquid substantially consisting of hydrocarbons may be injected and circulated through the bore-hole. The injected circulation liquid may carry the sulphur to the surface either as a slurry or fully dissolved. Preferably the ratio of the injected circulation liquid and the amount of sulphur is such that the elemental sulphur is fully dissolved. It will be appreciated that at least a part of the elemental sulphur has to be removed from the injected circulation liquid prior to reinjection into the well. The sulphur can be removed for instance by extraction with a sodium sulphide solution or with a sodium hydrogen sulphide solution. It has now been found that the elemental sulphur very suitably can be removed by heating the sulphur containing injected circulation liquid, substantially consisting of hydrocarbons, whereby at least a part of the sulphur is converted into hydrogen sulphide.

The present invention, therefore, relates to a process for the production of at least a gaseous product containing a substantial amount of hydrogen sulphide via a bore-hole from an underground formation containing besides the hydrogen sulphide at least elemental sulphur, comprising (a) injection of a liquid substantially consisting of hydrocarbons into the bore-hole or into the underground formation near to the end of the bore-hole;
(b) producing a gaseous and a liquid fraction from the underground formation;
(c) separating the gaseous fraction from the liquid fraction;
(d) if necessary, separating an aqueous fraction of the produced liquid fraction from the hydrocarbons-containing fraction;
(e) heating the hydrocarbons-containing fraction in order to remove elemental sulphur, and
(f) reinjection of at least a part of the thus treated hydrocarbons-containing fraction into the bore-hole or into the underground formation near to the end of the bore-hole as described hereinbefore.

During the heating process elemental sulphur dissolved in the hydrocarbons containing fraction is converted mainly into hydrogen sulphide. The hydrogen required is provided by the hydrocarbons-containing fraction, and/or is provided by a stream of hydrogen-containing gas, as will be discussed below.

The process of the present invention is suitable for the production of hydrogen sulphide containing gases from underground formations which also contain elemental sulphur, for instance natural gas reservoirs as well as reservoirs containing almost pure hydrogen sulphide. As a general rule, the amount of elemental sulphur increases with a higher hydrogen sulphide content, and therefore the present process is especially suitable for gaseous products produced from underground formations containing an amount of hydrogen sulphide of at least 50%, preferaby 75%. The amount of injected circulating hydrocarbons-containing fraction, and the velocity of recirculation is suitably chosen in such a way that the reinjected recirculating hydrocarbons-containing fraction contains an amount of elemental sulphur of 0.1% to 10% by weight, calculated on the amount of injected circulating liquid, preferably 0.2% to 8%, more preferably of 1 to 6%.

The reaction temperature to which the hydrocarbons-containing fraction is heated in order to remove elemental sulphur is between 135° and 250° C., preferably 225° C. It is maintained at that temperature for a period of time necessary to remove the desired amount of sulphur. Temperatures of 300° C. or more cannot be used due to the formation of large amounts of coke. The formation of small amounts of coke already starts at temperatures about 250° C. It will be appreciated that sometimes it will be advantageous to remove the sulphur only to a certain limit, for instance to 1 or 2%, and/or to remove a predetermined amount of sulphur, for instance 4 or 6% (calculated on the amount of circulating liquid).

A suitable configuration for performing the heating part of the process may consist of an oil feed pump, a furnace and/or heat exchanger train, a soaker vessel (to provide the required residence time) and a low pressure phase separator with steam stripper and gas recovery system.

During the above-mentioned heating process the elemental sulphur dissolved in the hydrocarbons-containing fraction is converted mainly into hydrogen sulphide. The hydrogen required is provided by the oil. The thermal treatment, therefore, produces a somewhat more unsaturated hydrocarbons-containing fraction. It is necessary, therefore, to withdraw from time to time a certain amount of the recirculating fraction and to replace it by a fresh amount. The replacement of the hydrocarbons-containing fraction is preferably performed continuously.

The heating process may be carried out in a closed vessel without an inert atmosphere or under a hydrogen sulphide atmosphere, or in an inert gas atmosphere, for instance a nitrogen atmosphere.

A preferred embodiment of the present application is formed by carrying out the heating process under a hydrogen atmosphere. At least a part of the hydrogen necessary for the formation of hydrogen sulphide will be provided in that case by the molecular hydrogen from the hydrogen atmosphere, resulting in a lower formation of coke, and decreasing the amount of fresh hydrocarbons-containing fraction necessary to replace the circulating fraction. Using temperatures between 200° and 250° C. and a nominal one hour reaction time a conversion of sulphur into hydrogen sulphide of 60% or more can be achieved. At 250° C. a conversion of 85% may be obtained. Although the hydrogenation reaction should preferably use a stream of substantially pure hydrogen having a hydrogen partial pressure of between 10 bar and 60 bar, preferably between 20 bar and 50 bar, especially preferred 40 bar, it will be appreciated that also a hydrogen-rich feed gas in which the partial pressure of the hydrogen has the values as mentioned before, may be employed, provided that the other component(s) of the feed gas are substantially inert under the reaction conditions.

A suitable configuration for performing the heating process of the present invention under a hydrogen atmosphere may consist of an oil feed pump, a hydrogen supply line, a reaction vessel, for instance a trickle flow reactor filled with inert materials, a high pressure separator, a low pressure separator with steam stripper and a gas recovery system.

A suitable hydrogen/oil ratio varies from 100 Nl/kg to 5000 Nl/kg, more especially about 1000 Nl/kg.

When carrying out the reaction under a hydrogen atmosphere, a still more preferred embodiment of the present application is formed by using a catalyst for the conversion of sulphur and molecular hydrogen into hydrogen sulphide. As a hydrogenation catalyst a catalyst may be employed comprising sulphides of one or more metals from Group VIB and/or Group VIII of the Periodic Table of Elements deposited on a support of alumina, silica or silica alumina of high surface area and low acidity. It has been found that the conventional cobalt molybdenum hydrodesulphurization catalysts are very effective. Preferably the hydrogen pressure is between 10 bar and 60 bar, more preferably between 20 bar and 50 bar, especially preferred 40 bar. It will be appreciated that also a hydrogen-rich feed gas may be employed, provided that the other component(s) of the feed are inert under the reaction conditions. In that case the partial pressure of the hydrogen has to correspond with the figures mentioned before. The reaction is suitably carried out at a temperature between 90° C. and 250° C., preferably between 100° C. and 200° C. At temperatures between 135° C. and 150° C. a conversion of elemental sulphur of 82 to 95% could be obtained. A suitable hydrogen/oil ratio varies from 100 Nl/kg to 5000 Nl/kg, more especially about 1000 Nl/kg. A suitable space velocity varies from 0.1 to 5 LHSV, preferably 1 LHSV.

The process of the present invention has the advantage over the known processes that no sulphur-containing waste is produced, as for instance is the case when an extraction technique, using for instance sodium sulphide, is used. It even enhances the yield of hydrogen sulphide, as the hydrogen sulphide formed during the conversion of elemental sulphur may be combined with the hydrogen sulphide containing gas from the underground formation. Another advantage of the process of the present invention over other sulphur-removing processes is that it is a relatively clean and simple process.

The injected circulating hydrocarbons-containing fraction to be used in the process of the present invention is suitably a refined distillate in the boiling range between 200° C. and 500° C., preferably a (mildly) hydrotreated distillate. The amount of recirculating oil suitably varies between 0.1 m$^3$ to 100 m$^3$ per thousand m$^3$ of reservoir gas, especially between 0.5 m$^3$ to 50 m$^3$, more especially 1 to 10 m$^3$. It is preferred to use an oil fraction having a relatively low hydrogen content, i.e. an oil having a high aromatics content. Highly aromatic oil distillate fractions are especially preferred because they are very suitable for the transport of sulphur through the bore-hole as well as being very suitable for the (catalytic) hydrogenation reaction, of the elemental sulphur.

The invention is now illustrated by the following examples which should not be regarded as limiting the invention in any way.

EXAMPLES

A sulphur-containing hydrocarbon fraction was prepared by dissolving 6 %w of sublimed sulphur in a hydrotreated hydrocarbon fraction at 135° C. under stirring. The solution was stored at 80°–100° C. until needed.

Analysis hydrocarbon fraction (before addition of sulphur):

| | |
|---|---|
| Carbon, % w | 88.37 |
| Hydrogen, % w | 11.12 |
| Sulphur, % w | .49 |
| Nitrogen, % w | NA |
| Aromatics by FIA, % vol | 72 |
| Viscosity, 40° C., cSt | 2.21 |
| Bromine No. | 5.90 |
| Distillation, °C. | |
| 10% w off | 201 |
| 30 | 226 |
| 50 | 250 |
| 70 | 278 |
| 90 | 320 |

The results of the non-catalytic experiments are summarized in Table 1. Although the experiments described are non-catalytic, a standard bench scale hydroprocessing unit was used. The reactor was packed with 100 ml of alumina extrudes (1.7 mm) diluted (1:1) with 0.2 mm silicon carbide. In this way, oil holdup would be similar to that in catalytic hydroprocessing experiments described hereinbelow. A metal insert was placed above the bed to minimize feed residence time in the preheat section of the reactor. Some experiments used nitrogen and others hydrogen feed gas. During start-up, the reactor was heated to about 100° C. prior to introducing oil feed. This was done to avoid the possibility of sulphur precipitation.

The results of the catalytic experiments are summarized in Table 2. A standard bench scale hydroprocessing unit was used. The reactor was packed with 100 ml of a sulphided cobalt/molybdenum on alumina catalyst (1.7 mm, Shell-444), diluted (1:1) with 0.2 mm silicon carbide. Runs 13 to 16 were conducted to look at the impact of hydrogen sulphide on the reaction kinetics (run 16 being an activity checkback run). Based on a comparison between runs 13, 15 and 16, and 11 and 14, the impact of 3 %v hydrogen sulphide on sulphur removal activity appears to be negligible.

TABLE I

| | THERMAL TREATING RESULTS | | | | | | |
|---|---|---|---|---|---|---|---|
| Sample No. | Feed | 1 | 2 | 3 | 4 | 5 | 6 |
| Run Conditions | | | | | | | |
| T, °C. | | 100 | 200 | 200 | 200 | 225 | 250 |
| LHSV, 1/l.h | | 1.00 | 1.00 | 1.01 | 1.02 | 1.00 | 0.99 |

TABLE I-continued

THERMAL TREATING RESULTS

| Sample No. | Feed | 1 | 2 | 3 | 4 | 5 | 6 |
|---|---|---|---|---|---|---|---|
| P, bar | | 40.0 | 40.0 | 39.4 | 39.5 | 39.9 | 39.9 |
| Gas/Oil, Nl/kg | | 1010 | 1010 | 980 | 980 | 1000 | 1000 |
| Gas | | $N_2$ | $N_2$ | $H_2$ | $H_2$ | $H_2$ | $H_2$ |
| Unit hours | | 6 | 14 | 74 | 98 | 146 | 193 |
| Liquid Analysis | | | | | | | |
| C, % w | 83.02 | NA | NA | 86.32 | 85.81 | 87.24 | 87.57 |
| H, % w | 10.39 | NA | NA | 10.57 | 10.63 | 10.62 | 10.75 |
| Total S, % w | 6.58 | NA | NA | 3.09 | 3.54 | 2.12 | 1.66 |
| Density, kg/m$^3$ | 920.0 | 910.0 | 915.0 | 917.8 | 917.8 | 920.1 | 912.0 |
| Yields, % w on Feed | | | | | | | |
| $C_1$-$C_4$ | 0 | NA | NA | 0 | 0 | 0 | 0 |
| Oil + S | 100 | NA | NA | 96.20 | 96.76 | 95.18 | 94.84 |
| $H_2S$ | 0 | NA | NA | 3.85 | 3.37 | 4.85 | 5.33 |
| Total | 100 | NA | NA | 100.05 | 100.13 | 100.03 | 100.17 |
| H consumption % w on feed | 0 | NA | NA | 0.05 | 0.13 | 0.03 | 0.17 |
| H in $H_2S$ product % w on feed | | 0.00 | 0.17 | 0.23 | 0.20 | 0.29 | 0.31 |
| H loss from oil % w on feed | | 0.00 | 0.17 | 0.18 | 0.07 | 0.26 | 0.14 |
| Elemental S, % w on feed | 6.11 | NA | NA | 2.56* | 3.02* | 1.58* | 1.11* |
| Elemental S conversion, % | | 1** | 44** | 59 | 52 | 74 | 82 |

*Calculated by difference, assuming 0.47% organic S
**Estimated from off-gas analysis

TABLE II

| Run No. | Feed | 1 | 2 | 3 | 4 | 5 | 6 | 7 | 8 |
|---|---|---|---|---|---|---|---|---|---|
| Temp. °C. | | 104 | 104 | 104 | 104 | 104 | 104 | 104 | 135 |
| LHSV, | | 0.97 | 1.03 | 0.99 | 1.01 | .501 | 1.03 | 2.03 | 2.05 |
| Cat Age, h | | 46 | 98 | 148 | 196 | 254 | 292 | 346 | 388 |
| Press., bar | | 40 | 40 | 40 | 20 | 40 | 40 | 40 | 40 |
| $H_2$/oil, Nl/kg | | 1040 | 980 | 510 | 1000 | 1010 | 990 | 1000 | 1000 |
| Density | 920.0 | 906.7 | 909.0 | 910.6 | 918.6 | 916.4 | 919.8 | 917.5 | 908.9 |
| C, % w | 83.02 | 87.57 | 87.52 | 87.44 | 85.55 | 86.90 | 85.27 | 85.23 | 87.56 |
| H, % w | 10.39 | 10.95 | 10.81 | 10.83 | 10.53 | 10.71 | 10.57 | 10.61 | 10.82 |
| S (total), % w | 6.58 | 1.46 | 1.65 | 1.71 | 3.90 | 2.37 | 4.14 | 4.14 | 1.60 |
| N, % w | 0.02 | NA | NA | NA | NA | NA | NA | NA | NA |
| Yields, % w on Feed | | | | | | | | | |
| $C_1$-$C_4$ | | 0.0 | 0.0 | 0.0 | 0.0 | 0.0 | 0.0 | 0.0 | 0.0 |
| Oil + S | 100.0 | 94.80 | 94.88 | 94.96 | 97.07 | 95.55 | 97.38 | 97.41 | 94.84 |
| $H_2S$ | | 5.52 | 5.33 | 5.27 | 3.01 | 4.59 | 2.74 | 2.73 | 5.38 |
| Total | 100.0 | 100.32 | 100.21 | 100.24 | 100.08 | 100.15 | 100.12 | 100.14 | 100.22 |
| H consumption* | 0 | 0.32 | 0.21 | 0.24 | 0.08 | 0.15 | 0.12 | 0.14 | 0.22 |
| H in $H_2S$ product* | 0 | 0.32 | 0.31 | 0.31 | 0.18 | 0.27 | 0.16 | 0.16 | 0.32 |
| H loss from oil* | 0 | 0 | 0.10 | 0.07 | 0.10 | 0.12 | 0.04 | 0.02 | 0.10 |
| Elem. S., est. % on Fd** | 6.11 | 0.94 | 1.11 | 1.17 | 3.30 | 1.81 | 3.54 | 3.54 | 1.07 |
| Conversion, % | 0 | 84.6 | 81.8 | 80.8 | 46.1 | 70.4 | 42.0 | 41.9 | 82.5 |
| $k_2^s$ | 0 | 0.88 | 0.76 | 0.68 | 0.14 | 0.20 | 0.12 | 0.24 | 1.58 |

| Run No. | 9 | 10 | 11 | 12 | 13 | 14 | 15 | 16 |
|---|---|---|---|---|---|---|---|---|
| Temp. °C. | 150 | 135 | 200 | 150 | 135 | 200 | 135 | 135 |
| LHSV, | 2.01 | 1.04 | 1.00 | 0.99 | 0.98 | 1.08 | 1.01 | 1.03 |
| Cat Age, h | 436 | 484 | 528 | 578 | 628 | 676 | 724 | 772 |
| Press., bar | 40 | 40 | 40 | 40 | 40 | 40 | 40 | 40 |
| $H_2$/oil, Nl/kg | 1010 | 980 | 1010 | 1020 | 1000 | 910 | 960 | 980 |
| Density | 902.5 | 904.2 | 900.4 | 900.7 | 906.3 | 903.1 | 904.6 | 908.6 |
| C, % w | 87.94 | 88.01 | 88.23 | 88.09 | 87.81 | 88.37 | 88.01 | 87.92 |
| H, % w | 10.94 | 10.91 | 11.00 | 10.93 | 10.95 | 10.86 | 10.87 | 10.85 |
| S (total), % w | 1.10 | 1.04 | 0.75 | 0.96 | 1.20 | 0.75 | 1.08 | 1.21 |
| N, % w | NA | NA | NA | NA | NA | NA | NA | NA |
| Yields, % w on Feed | | | | | | | | |
| $C_1$-$C_4$ | 0.0 | 0.0 | 0.0 | 0.0 | 0.0 | 0.0 | 0.0 | 0.0 |
| Oil + S | 94.48 | 94.41 | 94.23 | 94.36 | 94.66 | 94.07 | 94.40 | 94.55 |
| $H_2S$ | 5.90 | 5.97 | 6.26 | 6.05 | 5.81 | 6.26 | 5.93 | 5.81 |
| Total | 100.38 | 100.38 | 100.49 | 100.41 | 100.47 | 100.33 | 100.33 | 100.36 |
| H consumption* | 0.38 | 0.38 | 0.49 | 0.41 | 0.47 | 0.33 | 0.33 | 0.36 |
| H in $H_2S$ product* | 0.35 | 0.35 | 0.37 | 0.36 | 0.34 | 0.36 | 0.35 | 0.34 |
| H loss from oil* | −0.03 | −0.03 | −0.12 | −0.05 | −0.13 | 0.03 | 0.02 | −0.02 |
| Elem. S., % on Fd** | 0.59 | 0.53 | 0.26 | 0.45 | 0.67 | 0.26 | 0.56 | 0.68 |
| Conversion, % | 90.4 | 91.4 | 95.8 | 92.6 | 89.0 | 95.8 | 90.8 | 88.9 |
| $k_2^s$ | 3.10 | 1.79 | 3.72 | 2.03 | 1.29 | 4.02 | 1.63 | 1.34 |

*% w on feed
**Calculated by difference, assuming 0.47% organic S.

What is claimed is:

1. A process for the production of at least a gaseous product containing a substantial amount of hydrogen sulphide via a bore-hole from an underground formation containing besides the hydrogen sulphide at least elemental sulphur, comprising (a) injection of a liquid substantially consisting of hydrocarbons into the bore-hole or into the underground formation near to the end of the bore-hole;

(b) producing a gaseous and a liquid fraction from the underground formation;

(c) separating the gaseous fraction from the liquid fraction;

(d) if necessary, separating an aqueous fraction of the produced liquid fraction from the hydrocarbons-containing fraction;

(e) heating the hydrocarbons-containing fraction in order to remove elemental sulphur by conversion to hydrogen sulphide in the presence of a catalyst comprising sulphides of one or more metals from Group VIB and/or Group VIII of the Periodic Table of Elements deposited on a support of alumina, silica or silica alumina; and (f) reinjection of at least a part of the thus treated hydrocarbons-containing fraction into the bore-hole or into the underground formation near to the end of the bore-hole as described hereinbefore.

2. A process according to claim 1 wherein the hydrocarbons-containing fraction is heated in step (e) to a reaction temperature between 135° C. and 250° C.

3. A process according to claim 1 wherein the heating of the sulphur-containing hydrocarbons-containing fraction in step (e) is performed under a hydrogen atmosphere.

4. A process according to claim 3 wherein the hydrocarbons-containing fraction is heated in step (e) to a reaction temperature between 200° and 250° C.

5. A process according to claim 1, wherein the reinjected recirculating oil is replaced from time to time by a fresh amount of oil.

6. A process according to claim 1, wherein the catalyst is a cobalt/molybdenum catalyst.

7. A process according to claim 1, wherein the injected hydrocarbons-containing fraction is a highly aromatic oil distillate fraction.

8. A process according to claim 4 wherein the catalyst is a cobalt/molybdenum catalyst.

9. A process according to claim 8, wherein the injected hydrocarbons-containing fraction is a highly aromatic oil distillate fraction.

* * * * *